United States Patent
Park et al.

(10) Patent No.: US 11,264,682 B2
(45) Date of Patent: Mar. 1, 2022

(54) POUCH-SHAPED SECONDARY BATTERY COMPRISING ELECTRODE LEAD HAVING ASYMMETRICAL NOTCH FORMED THEREIN

(71) Applicant: LG Chem, Ltd., Seoul (KR)

(72) Inventors: Jong Pil Park, Daejeon (KR); Kyoung Ho Kim, Daejeon (KR); Min Woo Lee, Daejeon (KR); Sang Hun Kim, Daejeon (KR); Yong Kim, Daejeon (KR)

(73) Assignee: LG Energy Solution, Ltd.

( * ) Notice: Subject to any disclaimer, the term of this patent is extended or adjusted under 35 U.S.C. 154(b) by 46 days.

(21) Appl. No.: 16/482,531

(22) PCT Filed: Jul. 2, 2018

(86) PCT No.: PCT/KR2018/007483
§ 371 (c)(1),
(2) Date: Jul. 31, 2019

(87) PCT Pub. No.: WO2019/009576
PCT Pub. Date: Jan. 10, 2019

(65) Prior Publication Data
US 2020/0251713 A1 Aug. 6, 2020

(30) Foreign Application Priority Data
Jul. 6, 2017 (KR) .......................... 10-2017-0085693

(51) Int. Cl.
*H01M 50/578* (2021.01)
*H01M 50/54* (2021.01)

(52) U.S. Cl.
CPC ......... *H01M 50/578* (2021.01); *H01M 50/54* (2021.01)

(58) Field of Classification Search
CPC .... H01M 50/578; H01M 50/54; H01M 50/10; H01M 50/531; H01M 50/572;
(Continued)

(56) References Cited

U.S. PATENT DOCUMENTS 6,653,018 B2 11/2003 Takahashi et al.
6,743,546 B1 6/2004 Kaneda et al.
(Continued)

FOREIGN PATENT DOCUMENTS

CN 1560955 A 1/2005
CN 101355181 A 1/2009
(Continued)

OTHER PUBLICATIONS

Extended European Search Report including Written Opinion for Application No. EP18827525.9, dated Feb. 14, 2020, pp. 1-7.
(Continued)

*Primary Examiner* — Christian Roldan
(74) *Attorney, Agent, or Firm* — Lerner, David, Littenberg, Krumholz & Mentlik, LLP

(57) ABSTRACT

Disclosed herein is a pouch-shaped secondary battery including a battery case, an electrode assembly having a structure in which a positive electrode and a negative electrode are stacked in the state in which a separator is interposed therebetween, an electrode lead having an asymmetrical notch formed in a first surface of the electrode lead, the electrode lead being electrically connected to electrode tabs of the electrode assembly, the asymmetrical notch being configured to induce the rupture of the electrode lead, a lead film attached to the first surface and a second surface of the electrode lead, the lead film adhering the electrode lead to the battery case, the lead film including a first lead film located between the electrode assembly and the asymmetrical notch, and a second lead film located between the
(Continued)

asymmetrical notch and a portion of the electrode lead that protrudes out of the battery case.

10 Claims, 4 Drawing Sheets

(58) Field of Classification Search
CPC .......... H01M 2200/20; H01M 50/543; H01M 50/116; Y02E 60/10
USPC .......................................................... 429/62
See application file for complete search history.

(56) References Cited

U.S. PATENT DOCUMENTS

| | | |
|---|---|---|
| 2001/0038938 A1 | 11/2001 | Takahashi et al. |
| 2005/0014036 A1 | 1/2005 | Kim |
| 2011/0104520 A1 | 5/2011 | Ahn |
| 2013/0344379 A1 | 12/2013 | Yang et al. |
| 2014/0011060 A1 | 1/2014 | Yang et al. |
| 2015/0180016 A1 | 6/2015 | Choi et al. |
| 2017/0110711 A1 | 4/2017 | Ahn et al. |
| 2017/0117515 A1 | 4/2017 | Ahn et al. |
| 2018/0053976 A1 | 2/2018 | Park et al. |
| 2018/0062151 A1 | 3/2018 | Kim |

FOREIGN PATENT DOCUMENTS

| | | | |
|---|---|---|---|
| JP | 2000285904 A | | 10/2000 |
| JP | 2002008629 A | | 1/2002 |
| JP | 2005044523 A | | 2/2005 |
| JP | 2011096664 A | | 5/2011 |
| JP | 2011249128 A | | 12/2011 |
| JP | 2017076601 A | | 4/2017 |
| KR | 101192077 B1 | | 10/2012 |
| KR | 20120139590 A | | 12/2012 |
| KR | 20130117637 A | | 10/2013 |
| KR | 101335122 B1 | | 12/2013 |
| KR | 20150074439 A | | 7/2015 |
| KR | 20170021102 | * | 8/2015 |
| KR | 101601123 B1 | | 3/2016 |
| KR | 101614434 B1 | | 5/2016 |
| KR | 20160129763 A | | 11/2016 |
| KR | 20170021102 A | | 2/2017 |
| KR | 20170047046 A | | 5/2017 |
| WO | 2016171517 A1 | | 10/2016 |

OTHER PUBLICATIONS

International Search Report for Application No. PCT/KR2018/007483, dated Oct. 17, 2018, pp. 1-2.
Chinese Search Report for Application No. 2018800047856, dated May 30, 2021, 2 pages.

* cited by examiner

[FIG. 1]
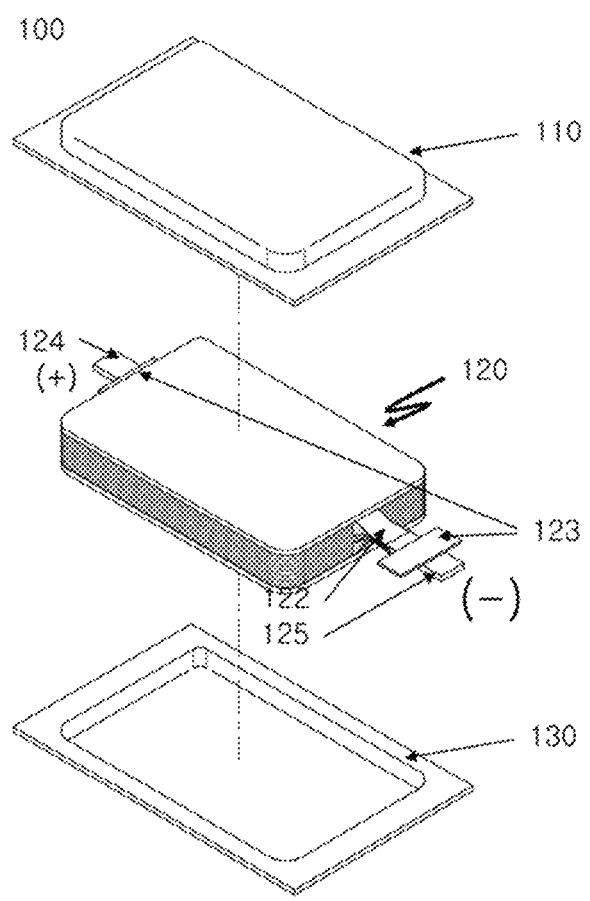

[FIG. 2]
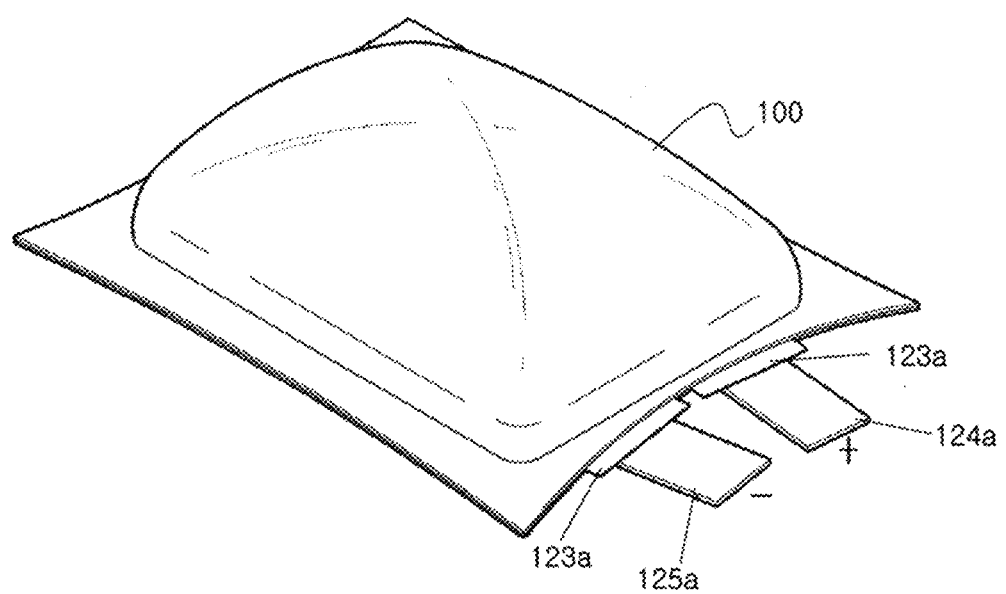

【FIG. 3】
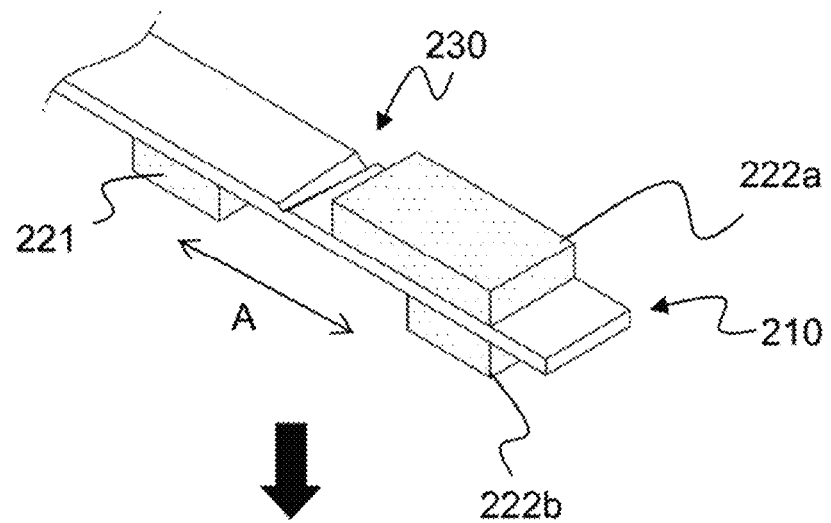
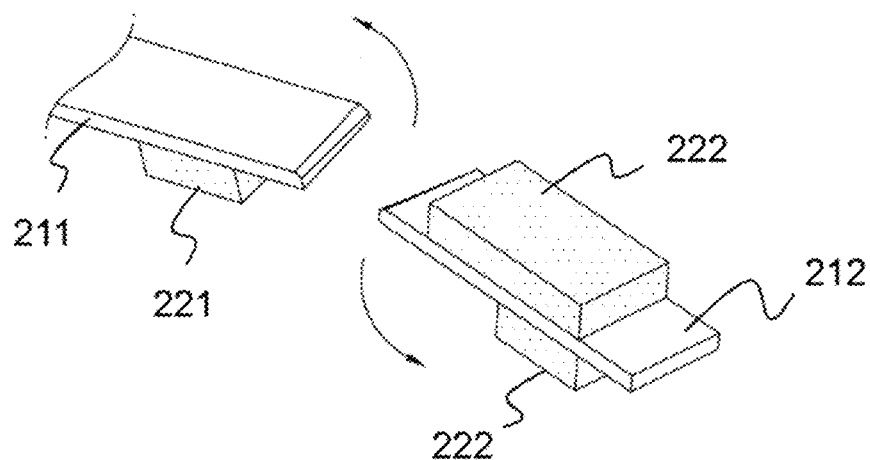

[FIG. 4]
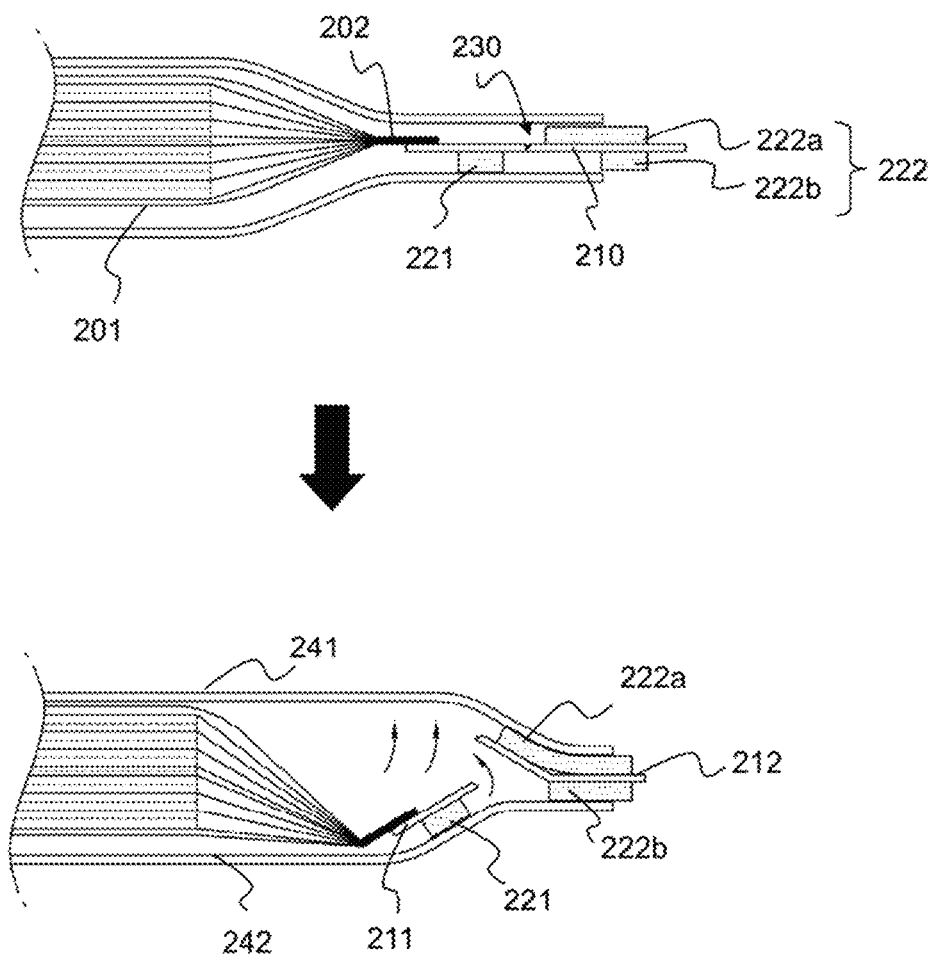

POUCH-SHAPED SECONDARY BATTERY COMPRISING ELECTRODE LEAD HAVING ASYMMETRICAL NOTCH FORMED THEREIN

CROSS-REFERENCE TO RELATED APPLICATIONS

This application is a national phase entry under 35 U.S.C. § 371 of International Patent Application No. PCT/KR2018/007483, filed on Jul. 2, 2018, published in Korean, which claims the benefit of the filing date of Korean Patent Application No. 10-2017-0085693, filed on Jul. 6, 2017, the disclosures of which are hereby incorporated by reference herein in their entireties.

TECHNICAL FIELD

The present invention relates to a pouch-shaped secondary battery including an electrode lead having an asymmetrical notch formed therein, and more particularly to a secondary battery configured such that a notch having varying depth and width is formed in an electrode lead connected to electrode tabs such that the electrode lead easily ruptures to interrupt the flow of current in the secondary battery under desired conditions.

BACKGROUND ART

In general, there are various kinds of secondary batteries, such as a nickel cadmium battery, a nickel hydride battery, a lithium ion battery, and a lithium ion polymer battery. Such secondary batteries have been used in large-sized products that require high output, such as an electric vehicle and a hybrid electric vehicle, a power storage device for storing surplus power or new and renewable energy, and a backup power storage device, as well as small-sized products, such as a digital camera, a portable digital versatile disc (P-DVD) player, a cellular phone, a wearable device, a portable game device, a power tool, and an electric bicycle (E-bike).

In terms of the shape of batteries, the demand for prismatic secondary batteries or pouch-shaped secondary batteries, which are thin enough to be applied to products such as cellular phones, is very high. In terms of the material for batteries, the demand for lithium secondary batteries, such as lithium ion batteries or lithium ion polymer batteries, which exhibit high energy density, discharge voltage, and output stability, is also very high.

In addition, such secondary batteries may be classified into a cylindrical battery cell, a prismatic battery cell, and a pouch-shaped battery cell based on the shapes thereof. Among these battery cells, the pouch-shaped battery cell, which can be stacked with high integration, has high energy density per unit weight, is inexpensive, and can be easily modified, has attracted considerable attention.

Meanwhile, the cylindrical battery cell and the prismatic battery cell use a current interrupt device (CID) for physically interrupting the series connection of the battery cell using a phenomenon in which the pressure in the battery cell increases when the battery cell expands due to malfunction of the battery cell or overcharging of the battery cell. In contrast, the pouch-shaped battery cell does not include such a member.

In the case in which overcurrent flows in the pouch-shaped battery cell due to abnormal use of the battery cell, therefore, it is not possible to interrupt the flow of such overcurrent in the battery cell, whereby the battery cell may explode.

In order to solve this problem, a separate device may be further provided in the battery cell. In this case, however, the capacity of the battery cell is reduced, which goes against the trend of manufacturing a large-capacity, high-efficiency battery cell.

In connection therewith, Korean Patent Application Publication No. 2016-0129763 discloses a battery having a bimetal tab including metals having different coefficients of thermal expansion, wherein the upper part and the lower part of the bimetal tab thermally expand differently from each other under abnormal operating conditions, e.g. at a high temperature, in order to cut an electrode lead.

Korean Registered Patent No. 1601123 discloses a secondary battery including a first electrode lead connected to an electrode tab and a second electrode lead separably connected to the first electrode lead, the second electrode lead extending from the inside to the outside of a battery case so as to be exposed, wherein the electrode leads are separated from each other in order to interrupt the flow of current in the secondary battery when the inner pressure of the secondary battery increases due to an abnormal state of the secondary battery.

Korean Registered Patent No. 1614434 discloses a secondary battery configured such that, when overcurrent flows in the secondary battery due to the occurrence of a short circuit in the secondary battery, a connecting member installed in the path along which current flows in the secondary battery rapidly ruptures in order to interrupt the flow of overcurrent in the secondary battery, thereby guaranteeing safe use of the secondary battery.

Korean Patent Application Publication No. 2012-0139590 discloses a secondary battery configured such that, when the temperature of a lead-free soldering bridge included in a melting separation unit increases to 150 to 300 degrees due to overcurrent flowing through an electrode lead, the electrode lead ruptures based on the melting separation unit, whereby the flow of overcurrent is irreversibly interrupted.

However, there has not been proposed any technology capable of rapidly and accurately interrupting the flow of current through an easily rupturable structure formed in an electrode lead connected to an electrode tab under an abnormal operating environment of a battery cell.

Therefore, there is a strong necessity for technology capable of interrupting the flow of current in a battery cell in an abnormal state of the battery cell, e.g. when the volume of the battery cell increases, even without the provision of an additional device.

DISCLOSURE

Technical Problem

The present invention has been made in view of the above problems, and it is an object of the present invention to provide technology capable of enabling an electrode lead electrically connected to electrode tabs of an electrode assembly to rapidly rupture though an asymmetrical notch formed in one surface of the electrode lead in order to induce the rupture of the electrode lead when a secondary battery swells due to the abnormal use of the secondary battery.

In addition, the notch may be formed such that the notch has a nonuniform depth and width. In this case, the portion of the electrode lead at which the depth and the width of the notch are larger may rapidly rupture, making it possible to interrupt the flow in the battery cell even in the case in which the inner pressure of the battery cell is low.

When the secondary battery is in an abnormal state, therefore, it is possible to prevent the secondary battery from exploding due to the high-temperature ignition thereof, whereby it is possible to provide a secondary battery having improved safety.

Technical Solution

In accordance with an aspect of the present invention, the above and other objects can be accomplished by the provision of a pouch-shaped secondary battery including a battery case, an electrode assembly having a structure in which a positive electrode and a negative electrode are stacked in the state in which a separator is interposed therebetween, an electrical lead having an asymmetrical notch formed in a first surface of the electrode lead, the electrode lead being electrically connected to electrode tabs of the electrode assembly, the asymmetrical notch being configured to induce the rupture of the electrode lead, a lead film attached to the first surface and a second surface of the electrode lead, the lead film adhering the electrode lead to the battery case, the lead film including a first lead film located between the electrode assembly and the asymmetrical notch, and a second lead film located between the symmetrical notch and a portion of the electrode lead that protrudes out of the battery case.

Since the notch is formed in one surface of the electrode lead connected to the electrode tabs and the lead films are attached to opposite surfaces of the electrode lead in order to increase the force of adhesion to the battery case, as described above, it is possible to induce the rupture of the electrode lead when the battery case expands due to an increase in the inner pressure of the battery cell.

Consequently, it is possible to solve a problem occurring in a conventional pouch-shaped secondary battery in that a device for physically interrupting the connection of the battery using the expansion pressure of the battery case due to malfunction of the battery, such as a current interrupt device (CID), is not provided, with the result that it is difficult to interrupt the flow in the battery in an initial state when heat is generated from the battery or when the battery expands, unlike a metal-can-type secondary battery.

In addition, since an additional member for rapidly interrupting the flow of current in the battery cell is not included in the battery cell, it is possible to prevent a reduction in the capacity of the battery cell and to use a conventional battery cell manufacturing process without any change.

In a concrete example, the first lead film may be only attached to the electrode lead at the second surface, which is the surface of the electrode lead that is opposite the surface of the electrode lead in which the notch is formed. Consequently, it is possible to move the ruptured electrode lead toward the battery case to which the first lead film is attached.

The second lead film may be attached to the first surface and the second surface of the electrode lead such that at least a portion of the second lead film attached to the first surface of the electrode lead and at least a portion of the second lead film attached to the second surface of the electrode lead overlap each other in a vertical direction perpendicular to a longitudinal direction of the electrode lead. Consequently, the second lead film may surround the electrode lead at opposite surfaces of the electrode lead when the battery case is thermally fused so as to be sealed in the state in which the second lead film is attached to the electrode lead.

The second lead film may include an upper lead film, which is attached to the first surface of the electrode lead, and a lower lead film, which is attached to the second surface of the electrode lead, the upper lead film and the lower lead film having respective planar sizes that are different from each other. For example, the second lead film may be configured such that a size of a portion of the second lead film that is attached to the second surface of the electrode lead is smaller than a size of a portion of the second lead film that is attached to the first surface of the electrode lead.

When the notch formed in the electrode lead ruptures, therefore, in the state in which the electrode lead to which the second lead film is attached is fixed to the sealed portion of the battery case, the electrode lead to which the second lead film is attached moves toward the battery case to which the second lead film, which is attached to the surface of the electrode lead in which the notch is formed and has a relatively large size, is attached, and the electrode lead to which the first lead film, which is attached to the surface of the electrode lead in which no notch is formed, is attached moves toward the battery case to which the first lead film is attached.

That is, the structure in which the first lead film is attached only at the other surface of the electrode lead, in which no notch is formed, and in which the second lead film is attached to opposite surfaces of the electrode lead while having different sizes is provided in order to move one side of the electrode lead toward an upper case and to move the other side of the electrode lead toward a lower case when the electrode lead ruptures or in order to move one side of the electrode lead toward the lower case and to move the other side of the electrode lead toward the upper case when the electrode lead ruptures.

In a concrete example, the electrode lead may be formed so as to rupture in a direction perpendicular to the longitudinal direction of the electrode lead, which is connected to the electrode tabs and protrudes out of the battery case. The asymmetrical notch may be continuously formed in the electrode lead from a first edge of the first surface of the electrode lead to a second edge of the first surface of the electrode lead in a lateral direction perpendicular to the longitudinal direction of the electrode lead.

In addition, the notch may be formed so as to have an asymmetrical shape, rather than to have a uniform size and shape, such that the electrode lead can rapidly and accurately rupture at the portion thereof in which the notch is formed.

Specifically, a depth of a concave middle part of the asymmetrical notch may be increased between the first and second edges, the depth being defined in a vertical direction perpendicular to both the lateral and longitudinal directions of the electrode lead.

That is, the depth of the concave middle part of the notch may be continuously or discontinuously increased in the direction that faces from the right to the left of the electrode lead or in the direction that faces from the left to the right of the electrode lead. Preferably, the depth of the concave middle part of the notch may be continuously increased.

In addition, a width of the asymmetrical notch may be increased between the first and second edges, the width being defined in the longitudinal direction, in which the depth of the concave middle part of the notch is increased. The portion of the notch at which the depth of the concave middle part of the notch and the width of the notch are largest may rupture first.

In a concrete example, a first thickness of the portion of the electrode lead in which the asymmetrical notch is formed may be 10% to 90%, specifically 30% to 80%, of a second thickness of the portion of the electrode lead in which no notch is formed, the first and second thicknesses each being defined in a vertical direction perpendicular to a longitudinal direction of the electrode lead. In the case in which the thickness of the portion of the electrode lead in which the notch is formed is less than 10% of the thickness of the portion of the electrode lead in which no notch is formed, the electrode lead may rupture even in the normal operating state of the battery cell, which is undesirable. In the case in which the thickness of the portion of the electrode lead in which the notch is formed is greater than 90% of the thickness of the portion of the electrode lead in which no notch is formed, on the other hand, it is difficult to induce the rupture of the electrode lead under desired conditions, which is also undesirable.

Meanwhile, the depth of the concave middle part of the notch may be continuously or discontinuously increased, and the ratio of the minimum value to the maximum value of the depth of the asymmetrical notch may between 0.1 and 0.9, specifically between 0.3 and 0.7.

In a concrete example, the electrode lead may include an inner electrode lead and an outer electrode lead, the first lead film being attached to the inner electrode lead, and the second lead film being attached to the outer electrode lead, the asymmetrical notch extending between the inner electrode lead and the outer electrode lead. The inner electrode lead and the outer electrode lead may be configured to be attached to different respective ones of an upper part and a lower part of the battery case when the asymmetrical notch is in a ruptured state.

Meanwhile, the pouch-shaped secondary battery may be a lithium secondary battery, such as a lithium ion battery or a lithium ion polymer battery, which exhibits high energy density, discharge voltage, and output stability.

In general, a lithium secondary battery includes a positive electrode, a negative electrode, a separator, and a non-aqueous electrolytic solution containing lithium salt.

Hereinafter, other components of the lithium secondary battery will be described.

The positive electrode may be manufactured, for example, by applying a positive electrode mixture of a positive electrode active material including positive electrode active material particles, a conductive agent, and a binder to a positive electrode current collector. A filler may be further added to the positive electrode mixture as needed.

In general, the positive electrode current collector is manufactured so as to have a thickness of 3 to 500 μm. The positive electrode current collector is not particularly restricted, as long as the positive electrode current collector exhibits high conductivity while the positive electrode current collector does not induce any chemical change in a battery to which the positive electrode current collector is applied. For example, the positive electrode current collector may be made of stainless steel, aluminum, nickel, or titanium. Alternatively, the positive electrode current collector may be made of aluminum or stainless steel, the surface of which is treated with carbon, nickel, titanium, or silver. Specifically, the positive electrode current collector may be made of aluminum. The positive electrode current collector may have a micro-scale uneven pattern formed on the surface thereof so as to increase the force of adhesion of the positive electrode active material. The positive electrode current collector may be configured in various forms, such as those of a film, a sheet, a foil, a net, a porous body, a foam body, and a non-woven fabric body.

The positive electrode active material may be, but is not limited to, a layered compound, such as a lithium nickel oxide ($LiNiO_2$), or a compound substituted with one or more transition metals; a lithium manganese oxide represented by the chemical formula $Li_{1+x}Mn_{2-x}O_4$ (where x=0 to 0.33) or a lithium manganese oxide, such as $LiMnO_3$, $LiMn_2O_3$, or $LiMnO_2$; a lithium copper oxide ($Li_2CuO_2$); a vanadium oxide, such as $LiV_3O_8$, $LiV_3O_4$, $V_2O_5$, or $Cu_2V_2O_7$; an Ni-sited lithium nickel oxide represented by the chemical formula $LiNi_{1-x}M_xO_2$ (where M=Co, Mn, Al, Cu, Fe, Mg, B, or Ga, and x=0.01 to 0.3); a lithium manganese composite oxide represented by the chemical formula $LiMn_{2-x}M_xO_2$ (where M=Co, Ni, Fe, Cr, Zn, or Ta, and $0.01 \leq x \leq 0.1$) or the chemical formula $Li_2Mn_3MO_8$ (where M=Fe, Co, Ni, Cu, or Zn); a disulfide compound; or $Fe_2(MoO_4)_3$, in addition to the positive electrode active material particles.

The conductive agent is generally added so that the conductive agent has 0.1 to 30 weight % based on the total weight of the compound including the positive electrode active material. The conductive agent is not particularly restricted, as long as the conductive agent exhibits high conductivity without inducing any chemical change in a battery to which the conductive agent is applied. For example, graphite, such as natural graphite or artificial graphite; carbon black, such as carbon black, acetylene black, Ketjen black, channel black, furnace black, lamp black, or summer black; conductive fiber, such as carbon fiber or metallic fiber; metallic powder, such as carbon fluoride powder, aluminum powder, or nickel powder; conductive whisker, such as zinc oxide or potassium titanate; a conductive metal oxide, such as a titanium oxide; or conductive materials, such as polyphenylene derivatives, may be used as the conductive agent.

The binder, which is included in the positive electrode, is a component assisting in binding between the active material and the conductive agent and in binding with the current collector. The binder is generally added in an amount of 0.1 to 30 weight % based on the total weight of the compound including the positive electrode active material. As examples of the binder, there may be used polyvinylidene fluoride, polyvinyl alcohol, carboxymethylcellulose (CMC), starch, hydroxypropylcellulose, regenerated cellulose, polyvinyl pyrrolidone, tetrafluoroethylene, polyethylene, polypropylene, ethylene-propylene-diene terpolymer (EPDM), sulfonated EPDM, styrene butadiene rubber, fluoro rubber, and various copolymers.

The negative electrode may be manufactured by applying a negative electrode mixture of a negative electrode active material including negative electrode active material particles, a conductive agent, and a binder to a negative electrode current collector. A filler may be further added to the negative electrode mixture as needed.

The negative electrode may be manufactured by applying a negative electrode active material to a negative electrode current collector and drying the same. The above-described components may be selectively further included as needed.

In general, the negative electrode current collector is manufactured so as to have a thickness of 3 to 500 μm. The negative electrode current collector is not particularly restricted, so long as the negative electrode current collector exhibits high conductivity while the negative electrode current collector does not induce any chemical change in a battery to which the negative electrode current collector is applied. For example, the negative electrode current collector may be made of copper, stainless steel, aluminum, nickel, titanium, or plastic carbon. Alternatively, the negative electrode current collector may be made of copper or stainless steel, the surface of which is treated with carbon, nickel, titanium, or silver, or an aluminum-cadmium alloy. In addition, the negative electrode current collector may have a micro-scale uneven pattern formed on the surface thereof so as to increase the force of adhesion of the negative electrode active material, in the same manner as the positive electrode current collector. The negative electrode current collector may be configured in various forms, such as those of a film, a sheet, a foil, a net, a porous body, a foam body, and a non-woven fabric body.

As the negative electrode active material, for example, there may be used carbon, such as a hard carbon or a graphite-based carbon; a metal composite oxide, such as $Li_xFe_2O_3$ ($0 \leq x \leq 1$), $Li_xWO_2$ ($0 \leq x \leq 1$), $Sn_xMe_{1-x}Me'_yO_z$ (Me: Mn, Fe, Pb, Ge; Me': Al, B, P, Si, Group 1, 2 and 3 elements of the periodic table, halogen; $0 < x \leq 1$; $1 \leq y \leq 3$; $1 \leq z \leq 8$); lithium metal; lithium alloy; silicon-based alloy; tin-based alloy; a metal oxide, such as SnO, $SnO_2$, PbO, $PbO_2$, $Pb_2O_3$, $Pb_3O_4$, $Sb_2O_3$, $Sb_2O_4$, $Sb_2O_5$, GeO, $GeO_2$, $Bi_2O_3$, $Bi_2O_4$, or $Bi_2O_5$; a conductive polymer, such as polyacetylene; or a Li—Co—Ni based material.

The separator is interposed between the positive electrode and the negative electrode. As the separator, for example, an insulative thin film that exhibits high ion permeability and mechanical strength is used. The separator generally has a pore diameter of 0.01 to 10 μm and a thickness of 5 to 300 μm. As the material for the separator, for example, a sheet or non-woven fabric made of olefin polymer, such as polypropylene, which exhibits chemical resistance and hydrophobicity, glass fiber, or polyethylene is used. In the case in which a solid electrolyte, such as a polymer, is used as an electrolyte, the solid electrolyte may also function as the separator.

The non-aqueous electrolytic solution containing lithium salt is composed of a non-aqueous electrolytic solution and lithium salt. A non-aqueous organic solvent, an organic solid electrolyte, or an inorganic solid electrolyte may be used as the non-aqueous electrolytic solution. However, the present invention is not limited thereto.

As examples of the non-aqueous organic solvent, mention may be made of non-protic organic solvents, such as N-methyl-2-pyrollidinone, propylene carbonate, ethylene carbonate, butylene carbonate, dimethyl carbonate, diethyl carbonate, gamma-butyro lactone, 1,2-dimethoxy ethane, tetrahydroxy Franc, 2-methyl tetrahydrofuran, dimethylsulfoxide, 1,3-dioxolane, formamide, dimethylformamide, dioxolane, acetonitrile, nitromethane, methyl formate, methyl acetate, phosphoric acid triester, trimethoxy methane, dioxolane derivatives, sulfolane, methyl sulfolane, 1,3-dimethyl-2-imidazolidinone, propylene carbonate derivatives, tetrahydrofuran derivatives, ether, methyl propionate, and ethyl propionate.

As examples of the organic solid electrolyte, mention may be made of polyethylene derivatives, polyethylene oxide derivatives, polypropylene oxide derivatives, phosphoric acid ester polymers, poly agitation lysine, polyester sulfide, polyvinyl alcohols, polyvinylidene fluoride, and polymers containing ionic dissociation groups.

As examples of the inorganic solid electrolyte, mention may be made of nitrides, halides, and sulphates of lithium (Li), such as $Li_3N$, LiI, $Li_5NI_2$, $Li_3N$—LiI—LiOH, $LiSiO_4$, $LiSiO_4$—LiI—LiOH, $Li_2SiS_3$, $Li_4SiO_4$, $Li_4SiO_4$—LiI—LiOH, and $Li_3PO_4$—$Li_2S$—$SiS_2$.

The lithium salt is a material that is readily soluble in the above-mentioned non-aqueous electrolyte, and may include, for example, LiCl, LiBr, LiI, $LiClO_4$, $LiBF_4$, $LiB_{10}Cl_{10}$, $LiPF_6$, $LiCF_3SO_3$, $LiCF_3CO_2$, $LiAsF_6$, $LiSbF_6$, $LiAlCl_4$, $CH_3SO_3Li$, $CF_3SO_3Li$, $(CF_3SO_2)_2NLi$, chloroborane lithium, lower aliphatic carboxylic acid lithium, lithium tetraphenyl borate, and imide.

In addition, in order to improve charge and discharge characteristics and flame retardancy, for example, pyridine, triethylphosphite, triethanolamine, cyclic ether, ethylenediamine, n-glyme, hexaphosphoric triamide, nitrobenzene derivatives, sulfur, quinone imine dyes, N-substituted oxazolidinone, N,N-substituted imidazolidine, ethylene glycol dialkyl ether, ammonium salts, pyrrole, 2-methoxy ethanol, aluminum trichloride, or the like may be added to the non-aqueous electrolytic solution. Depending on the circumstances, in order to impart incombustibility thereto, the non-aqueous electrolytic solution may further include halogen-containing solvents, such as carbon tetrachloride and ethylene trifluoride. Furthermore, in order to improve high-temperature retention characteristics thereof, the non-aqueous electrolytic solution may further include carbon dioxide gas. Moreover, fluoro-ethylene carbonate (FEC) and propene sultone (PRS) may be further included.

In addition, the electrode assembly is provided with electrode tabs protruding from plate-shaped electrode current collectors. Each electrode current collector includes a coated part, on which an electrode active material is coated, and a non-coated part, on which the electrode active material is not coated (hereinafter, referred to as a "non-coated part"). Each of the electrode tabs may be formed by cutting the non-coated part, or may be a separate conductive member connected to the non-coated part by ultrasonic welding.

Each electrode tab serves as a path along which electrons move between the inside and the outside of the battery. Each of the electrode leads is connected to a corresponding one of the electrode tabs by spot welding. The electrode leads may extend in the same direction or in opposite directions depending on the position at which positive electrode tabs and negative electrode tabs are formed. A positive electrode lead and a negative electrode lead may be made of different materials. For example, the positive electrode lead may be made of the same material as the positive electrode plate, such as an aluminum (Al) material, and the negative electrode lead may be made of the same material as the negative electrode plate, such as a copper (Cu) material or a copper material coated with nickel (Ni). Finally, the electrode leads are electrically connected to external terminals via terminal parts thereof.

In general, a positive electrode current collector plate is made of an aluminum material, and a negative electrode current collector plate is made of a copper material. When a swelling phenomenon occurs, copper foil tends to rupture more easily than aluminum foil. For this reason, the negative electrode lead may rupture more easily than the positive electrode lead. Preferably, therefore, an electrode lead capable of easily rupturing is used as the negative electrode lead.

In accordance with another aspect of the present invention, there is provided a battery pack including the pouch-shaped secondary battery.

Specifically, the battery pack may be used as a power source for a device requiring the ability to withstand high temperatures, a long cycle, high rate characteristics, etc. Specific examples of the device may include a mobile electronic device, a wearable electronic device, a power tool driven by a battery-powered motor, an electric automobile, such as an electric vehicle (EV), a hybrid electric vehicle (HEV), or a plug-in hybrid electric vehicle (PHEV), an electric two-wheeled vehicle, such as an electric bicycle (E-bike) or an electric scooter (E-scooter), an electric golf cart, and a power storage system. However, the present invention is not limited thereto.

The structure and manufacturing method of the device are well known in the art to which the present invention pertains, and a detailed description thereof will be omitted.

BRIEF DESCRIPTION OF DRAWINGS

FIG. 1 is a view showing an illustrative conventional pouch-shaped battery cell;

FIG. 2 is a view showing an increase in the volume of an illustrative pouch-shaped battery cell due to gas generated therein;

FIG. 3 is a perspective view showing an electrode lead, in which a notch is formed and to which a lead film is attached, according to an embodiment of the present invention before and after rupturing; and FIG. 4 is a partial vertical sectional view showing a pouch-shaped secondary battery including the electrode lead of FIG. 3.

DETAILED DESCRIPTION OF THE INVENTION

Now, preferred embodiments of the present invention will be described in detail with reference to the accompanying drawings such that the preferred embodiments of the present invention can be easily implemented by a person having ordinary skill in the art to which the present invention pertains. In describing the principle of operation of the preferred embodiments of the present invention in detail, however, a detailed description of known functions and configurations incorporated herein will be omitted when the same may obscure the subject matter of the present invention.

Wherever possible, the same reference numbers will be used throughout the drawings to refer to parts that perform similar functions or operations. Meanwhile, in the case in which one part is 'connected' to another part in the following description of the present invention, not only may the one part be directly connected to the another part, but also, the one part may be indirectly connected to the another part via a further part. In addition, that a certain element is 'included' means that other elements are not excluded, but may be further included unless mentioned otherwise.

Reference will now be made in detail to the preferred embodiments of the present invention, examples of which are illustrated in the accompanying drawings.

FIG. 1 is an exploded view showing a conventional pouch-shaped battery cell in which electrode terminals protrude in opposite directions, and FIG. 2 is a view showing the state in which a conventional pouch-shaped battery cell in which electrode terminals protrude in the same direction has expanded due to the inner pressure of the battery cell.

Referring to FIG. 1, an electrode assembly 120, in which a positive electrode and a negative electrode are stacked in the state in which a separator is interposed therebetween, is received in a battery case, which includes an upper case 110 and a lower case 130, protruding electrode tabs 122 are formed at opposite ends of the electrode assembly 120, and the protruding electrode tabs 122 are connected to electrode leads 124 and 125.

The other ends of the electrode leads 124 and 125, which are not connected to the electrode tabs, are exposed out of the battery case 110 and 130, and the battery case 110 and 130, which surrounds the electrode assembly, is sealed by adhesive layers located at the innermost sides thereof. Lead films 123 are attached to the portions of the electrode leads 124 and 125 interposed between the adhesive layers of the battery case in a sealed state.

Referring to FIG. 2, there is shown a pouch-shaped battery cell having a structure in which electrode terminals protrude in one direction, unlike the battery cell of FIG. 1. A positive electrode lead 124a and a negative electrode lead 125a protrude from a sealed portion of a battery case in one direction.

Lead films 123a are attached to the portions of the positive electrode lead 124a and the negative electrode lead 125a that abut the sealed portion of the battery case in a sealed state in order to increase sealing force.

An electrode assembly reception unit 100 expands due to an increase in the amount of gas generated in the battery cell during activation of the battery cell or as the result of abnormal use of the battery cell. The position or direction of the electrode terminals may be changed due to the expansion of the battery cell. In the case in which the battery cell expands to a specific level or more, the battery cell may explode.

Each of FIGS. 1 and 2 shows a secondary battery including a battery case configured to be divided into an upper case and a lower case. Of course, however, a secondary battery including a battery case configured such that an upper case and a lower case are connected to each other at corresponding sides thereof in order to form a single member falls within the scope of the present invention.

FIG. 3 is a perspective view showing an electrode lead, in which a notch is formed and to which a lead film is attached, and showing the state in which the electrode lead has ruptured.

Referring to FIG. 3, a straight notch 230 is formed in an electrode lead 210 from one side end to the other side end of the electrode lead in a direction perpendicular to the longitudinal direction A of the electrode lead. A first lead film 221 is attached to the lower surface of the portion of the electrode lead that is close to an electrode assembly based on the notch 230, and second lead films 222a and 222b are attached respectively to the upper surface and the lower surface of the portion of the electrode lead in the direction in which the electrode lead is withdrawn out of a battery case.

The size of the second lead film 222a, which is attached to the upper surface of the electrode lead, in which the notch 230 is formed, is greater than the size of the second lead film 222b, which is attached to the lower surface of the electrode lead. The second lead film 222a and the second lead film 222b are attached to the electrode lead so as to overlap each other in the state in which the electrode lead is disposed therebetween at the end of the electrode lead in the direction in which the electrode lead is withdrawn out of the battery case. Consequently, the overlapping portions of the second lead films may surround the electrode lead when the sealed portion of the battery case is thermally fused.

The depth of the notch 230 is continuously increased in the rightward direction, which is perpendicular to the longitudinal direction A of the electrode lead, and the width of the notch in the upper surface of the electrode lead is continuously increased in the rightward direction.

When the notch formed in the electrode lead ruptures, the electrode lead 210 may be divided into an inner electrode lead 211 and an outer electrode lead 212, and the right side of the electrode lead, at which the depth and the width of the notch are larger, may rupture first.

The thickness of the portion of the electrode lead in which the notch is formed may be 10% to 90% of the thickness of the portion of the electrode lead in which no notch is formed. The direction in which the depth and the width of the notch are increased and whether the depth and the width of the notch are increased continuously or discontinuously are not particularly restricted, as long as the notch is configured such that the depth and the width of the notch are increased.

FIG. 4 is a partial vertical sectional view schematically showing a pouch-shaped secondary battery including the electrode lead of FIG. 3.

Referring to FIG. 4, an electrode tab 202 protruding from one side of an electrode assembly 201 is coupled to the electrode lead at the end of one side of the electrode lead 210. One surface of the first lead film 221 is attached to the electrode lead, and the other surface of the first lead film is attached to the inner surface of a lower case 242.

The second lead film 222a, which is a portion of the second lead film 222 and which is attached to the upper surface of the electrode lead 210, is attached to an upper case 241 on the other surface thereof, which is opposite the surface thereof to which the electrode lead is attached. The second lead film 222b, which is attached to the lower surface of the electrode lead, is attached to the lower case 242 on the other surface thereof, which is opposite the surface thereof to which the electrode lead is attached.

Both the first lead film 221 and the second lead film 222 are located in an outer edge sealed portion of a pouch-shaped battery case.

When the pouch-shaped battery case expands outwards due to gas generated in the battery cell, the outer electrode lead 212 is bent upwards by the second lead film 222a, which is attached to the upper case 241, and the inner electrode lead 211 moves in the direction in which the lower case expands due to the first lead film 221, which is attached to the lower case 242. When the electrode leads moving in the direction in which the upper case expands and in the direction in which the lower case expands reach a predetermined limit, the notch formed in the electrode lead ruptures first. As shown in FIG. 3, the portion of the electrode lead at which the depth and the width of the notch are larger ruptures first.

In a pouch-shaped secondary battery including an electrode lead having an asymmetrical notch formed therein and first and second lead films attached to the electrode lead according to the present invention, the electrode lead ruptures to thus interrupt the flow of current in the secondary battery when a pouch-shaped battery case expands due to a desired level of pressure generated in the battery case, whereby it is possible to prevent the secondary battery from exploding due to the expansion of the battery case or from catching fire due to the high temperature in the battery case.

It will be apparent to those skilled in the art that various applications and modifications can be made without departing from the category of the present invention based on the above description.

INDUSTRIAL APPLICABILITY

As is apparent from the above description, a pouch-shaped secondary battery according to the present invention is configured such that an asymmetrical notch is formed in one surface of an electrode lead connected to electrode tabs. When the secondary battery expands due to abnormal operation thereof, the electrode lead easily ruptures due to the notch, whereby it is possible to rapidly interrupt the flow of current in the secondary battery.

In addition, the notch may be formed such that the notch has a nonuniform depth and width. In this case, the portion of the electrode lead at which the depth and the width of the notch are larger may rapidly rupture before the battery cell expands excessively, whereby it is possible to prevent the explosion or ignition of the battery cell.

The invention claimed is:

1. A pouch-shaped secondary battery comprising:
a battery case;
an electrode assembly having a structure in which a positive electrode and a negative electrode are stacked in a state in which a separator is interposed therebetween, the electrode assembly having electrode tabs, the electrode assembly being disposed inside of the battery case;
an electrode lead having an asymmetrical notch formed in a first surface of the electrode lead, the electrode lead being electrically connected to the electrode tabs of the electrode assembly, the asymmetrical notch being configured to induce a rupture of the electrode lead, the electrode lead having a portion thereof that protrudes out of the battery case; and
a lead film attached to the first surface and a second surface of the electrode lead, the lead film adhering the electrode lead to the battery case, the lead film comprising a first lead film located between the electrode assembly and the asymmetrical notch, and a second lead film located between the asymmetrical notch and the portion of the electrode lead that protrudes out of the battery case,
wherein the asymmetrical notch is continuously formed in the electrode lead from a first edge of the first surface of the electrode lead to a second edge of the first surface of the electrode lead in a lateral direction perpendicular to a longitudinal direction of the electrode lead, and
wherein a depth of a concave middle part of the asymmetrical notch is increased between the first and second edges, the depth being defined in a vertical direction perpendicular to both the lateral and longitudinal directions of the electrode lead, and a width of the asymmetrical notch is increased between the first and second edges, the width being defined in the longitudinal direction of the electrode lead,
wherein the asymmetrical notch is configured to rapidly and accurately induce the rupture of the electrode lead at a location at which the depth of the concave middle part of the asymmetrical notch and the width of the asymmetrical notch are largest, when the battery case expands due to an increase in an inner pressure within the battery case.

2. The pouch-shaped secondary battery according to claim 1, wherein the first lead film is only attached to the electrode lead at the second surface.

3. The pouch-shaped secondary battery according to claim 1, wherein the second lead film is attached to the first surface and the second surface of the electrode lead such that at least a portion of the second lead film attached to the first surface of the electrode lead and at least a portion of the second lead film attached to the second surface of the electrode lead overlap each other in a vertical direction perpendicular to a longitudinal direction of the electrode lead.

4. The pouch-shaped secondary battery according to claim 1, wherein the second lead film comprises an upper lead film, which is attached to the first surface of the electrode lead, and a lower lead film, which is attached to the second surface of the electrode lead, the upper lead film and the lower lead film having respective planar sizes that are different from each other.

5. The pouch-shaped secondary battery according to claim 2, wherein a size of a portion of the second lead film attached to the second surface of the electrode lead is less than a size of a portion of the second lead film attached to the first surface of the electrode lead.

6. The pouch-shaped secondary battery according to claim 1, wherein a first thickness of a portion of the electrode lead in which the asymmetrical notch is formed is 10% to 90% of a second thickness of a portion of the electrode lead in which no notch is formed, the first and second thicknesses each being defined in a vertical direction perpendicular to a longitudinal direction of the electrode lead.

7. The pouch-shaped secondary battery according to claim 1, wherein a ratio of a minimum value to a maximum value of the depth of the concave middle part of the asymmetrical notch is between 0.1 and 0.9.

8. The pouch-shaped secondary battery according to claim 1, wherein the electrode lead comprises an inner electrode lead and an outer electrode lead, the first lead film being attached to the inner electrode lead, and the second lead film being attached to the outer electrode lead, the asymmetrical notch extending between the inner electrode lead and the outer electrode lead.

9. The pouch-shaped secondary battery according to claim 8, wherein the inner electrode lead and the outer electrode lead are configured to be attached to different respective ones of an upper part and a lower part of the battery case when the asymmetrical notch is in a ruptured state.

10. A device comprising a pouch-shaped secondary battery according to claim 1.

* * * * *